United States Patent [19]

Nakayama et al.

[11] Patent Number: 5,655,159

[45] Date of Patent: Aug. 5, 1997

[54] CAMERA WITH ZOOMING LENS BARREL AND COUPLED VIEW FINDER

[75] Inventors: Haruki Nakayama; Satoshi Nakamoto; Yuichi Honda, all of Hachioji, Japan

[73] Assignee: Konica Corporation, Japan

[21] Appl. No.: 538,416

[22] Filed: Oct. 2, 1995

[30] Foreign Application Priority Data

Oct. 6, 1994 [JP] Japan ............... 6-243052

[51] Int. Cl.$^6$ ............................................. G03B 13/10
[52] U.S. Cl. ............................................. 396/84; 396/379
[58] Field of Search ................. 354/195.1, 195.12, 354/286; 359/696, 697, 698, 699, 700, 823, 824, 826; 396/84, 373, 379

[56] References Cited

U.S. PATENT DOCUMENTS 5,461,443  10/1995  Nakayama et al. ............... 354/195.1
5,576,779  11/1996  Ikemori et al. ................... 396/379 X

*Primary Examiner*—Howard B. Blankenship
*Attorney, Agent, or Firm*—Jordan B. Bierman; Bierman, Muserlian and Lucas LLP

[57] ABSTRACT

A camera having a zooming lens barrel. The zooming lens barrel includes: plural lens component; a guide portion for guiding one of the plural lens components along the guide portion in an optical axis direction of the plural lens components in which the guide portion has plural focal distance positions; a driver for moving one of the plural lens components along the guide portion in the optical axis direction; a movement controller for controlling the driver so as to move one of the plural lens components to a predetermined position. The guide portion includes a first area for performing focusing from the first focal distance position, a second area which is not used for focusing, and a third area for performing focusing from the second focal distance position.

10 Claims, 16 Drawing Sheets

CAMERA WITH ZOOMING LENS BARREL AND COUPLED VIEW FINDER

BACKGROUND OF THE INVENTION

The present invention relates to a zooming lens barrel for a photographing apparatus such as cameras, or the like, and more specifically to a zooming lens barrel having a view finder lens in which magnification is changed by zooming.

Recently, cameras with a lens shutter (a lens shutter camera, on which a zooming lens is mounted, have been popular, and normally, its view finder is an external-light type zoom finder. A zooming finder is mechanically interlocked with the zooming operation of a photographic lens.

In a zooming lens, the focal distance, that is, the photographic magnification is changed. Competition is keen for techniques for an increase of a variable magnification ratio, which is a ratio of the longest focal distance to the shortest focal distance, and for downsizing the zooming lens barrel. The technique for increasing the variable magnification ratio and that for downsizing the lens barrel are reciprocal to each other. Recently, however, various types of zooming lens barrels, in which dimensions of the lens barrel are not increased even in the case of the high variable magnification ratio, have been proposed.

As an example, a zooming lens barrel has been disclosed by the present applicant in Japanese Patent Publication Open to Public Inspection No. 226562/1994. That is, in this zooming lens barrel, focusing distance switching operations and focusing are conducted by a moving means such as a single motor or cams, and the structure for selecting the focusing distance switching operations and focusing in discrete steps is described in this patent publication.

In conventional zooming lenses, the change of the focal distance, i.e. zooming, and the focal point adjustment, i.e. focusing, are respectively conducted by independent mechanisms. However, in this patent publication, zooming and focusing can be conducted by the same mechanism, resulting in the realization of a very small size zooming lens barrel.

In this patent publication, this is a type of a zooming lens, in which the distance between the longest focal distance and the shortest focal distance is divided into a predetermined number of steps, that is, a so-called stepped zooming type lens. This step zooming method is explained in a zooming diagram shown in FIG. 1. In this diagram, the horizontal axis expresses the change of focal distance. In FIG. 1, W shows the shortest focal distance, the focal distance successively increases at $M_1$ and $M_2$, and T shows the longest focal distance. In this way, the focal distance is switched at 4 steps. The vertical axis shows the movement amount of the front lens component and the rear lens component of the photographic lens in the direction of the optical axis.

The front lens component is helicoidally screwed into a rotatable cam cylinder, and accordingly, the front lens component is linearly moved by the rotation of a lens frame. On the other hand, the rear lens component is driven by a cam formed on the cam cylinder. With regard to the photographic distance U, the cam is formed such that the rear lens component moves on a saw-toothed curve between ∞, i.e. the infinity focusing position and N, i.e. the nearest focusing position, as illustrated in FIG. 1. In the case where focusing is conducted when the focal distance is set at a position W, the front lens component and the rear lens component move between W and ① corresponding to the photographic distance. When zooming is conducted toward the telephoto side by 1 step, the front lens component and the rear lens component move to a position $M_1$ through ①. In the same way, when zooming is conducted by 2 steps toward the telephoto side, the front lens component and the rear lens component move to a position $M_2$ through ①, $M_1$, ②. Since the zooming lens is structured such that focusing and zooming are continuously conducted repeatedly by movement of the front lens component and the rear lens component, the front lens component and the rear lens component can be driven by the same mechanism as that for focusing and for zooming, so that the number of parts is inevitably decreased and the structure is simpler, resulting in a smaller sized zooming lens barrel.

The invention in the patent publication as explained above, much contributes to downsizing the zooming lens barrel; and the camera, to which this invention has been applied, is now being manufactured. However, the lens mounted on this camera is a zooming lens, the variable magnification ratio of which is 2. In the case where the zooming lens with a higher magnification ratio is mounted on the camera, the abovedescribed invention does not necessarily apply.

That is, when a zooming lens with a higher magnification ratio is used, it is necessary that a larger number of steps are adopted in the zooming lens, to utilize its advantage of high magnification. An enlarged view of the zooming diagram in FIG. 1 is shown in FIG. 2. In the same way as described above, when focusing is conducted at a focal distance position $M_W$, the rear lens component moves between ① and ②, as shown in FIG. 2. Next, when zooming is conducted toward the telephoto side by 1 step, the rear lens component moves to ③ through ②, and is located at a focal distance position $M_T$. In this zooming diagram, in the case where the number of steps are increased by using a zooming lens with a high magnification ratio, $M_M$ is positioned in the middle of $M_T$ and $M_W$, and zooming is conducted by 1 step, then, the rear lens component moves to ④ through ②, and is located at the focal distance $M_M$. Then, as can clearly be seen from FIG. 2, when the slope $\theta_1$ of the line between ② and ③, is compared to the slope $\theta_2$ of the line between ② and ④, the slope $\theta_2$ is larger than the slope $\theta_1$. Accordingly, the mechanical load to move the rear lens component is increased, and there is a possibility that the rear lens component can not be moved depending on the slope.

Accordingly, in order to decrease the slope $\theta_2$ and to easily operate the rear lens component, it is necessary to enlarge the step interval. However, the enlargement of the step interval in the direction of the horizontal axis, causes enlargement of the circumferential length of the cam cylinder, that is, enlargement of the diameter of the cam cylinder, resulting in a bigger lens barrel.

In order to solve the above problems, the present applicant proposed the following invention.

FIG. 3 is a zooming diagram showing the focal distance divided into 8 steps. In FIG. 3, the horizontal axis shows changes of the focal distance. The vertical axis shows movement of the front lens component and the rear lens component of the photographic lens in the direction of the optical axis. The front lens component is linearly moved by the helicoidal drive. The rear lens component moves in the direction which is separated from the front lens component and in the direction which approaches the front lens component, and this movement is reciprocally repeated. For example, in the case where the focal distance position is W, when zooming is conducted toward the telephoto side by 1 step, the focal distance position changes from W to $M_1$. Further, when zooming is conducted by 1 step, the focal distance position changes from $M_1$ to $M_2$. As described above, zooming can be conducted in 8 steps between W and T.

On the other hand, for example, when the focal distance position is W, focusing is conducted such that the front lens component and the rear lens component are moved from the focusing position on the infinity ($\infty$) side to that on the nearest (N) side in order to focus between W and $M_1$. Further, when the focal distance position is $M_1$, the front lens component and the rear lens component are moved from the focusing position on the nearest (N) side to that on the infinity ($\infty$) side in order to focus between $M_1$ and $M_2$. As described above, focusing is conducted at all steps prepared in the zooming area between W and T. This zooming lens is structured such that the rear lens component moves repeatedly from the infinity position to the nearest distance position, and from the nearest distance position to the infinity position, while the front lens component moves linearly.

Accordingly, in this zooming diagram, the focusing area is continuously provided in the zooming area. Accordingly, when this diagram is compared with that of the conventional technique in FIG. 1, although the number of steps of the focal distance position is 4 in FIG. 1, that in this diagram is increased to 8, which is two times the conventional one. However, in this diagram, the slope for the movement of the rear lens component is not increased, and the rear lens component can be smoothly operated.

That is, in the conventional technique, when focusing is conducted at an arbitrary focus position, the zooming lens always moves from the focusing position on the nearest distance side toward the focusing position on the infinity side, or from the focusing position on the infinity side toward the focusing position on the nearest side. However, in the zooming lens barrel described above, when focusing is conducted at an arbitrary position, the zooming lens moves from the focusing position on the nearest distance side toward the focusing position on the infinity side, and is switched to the next focus position. At this focus position, focusing is conducted when the zooming lens moves the focusing position on the infinity side toward the focusing position on the nearest side, the number of zooming steps (focus positions) can be increased.

FIG. 4 is a zooming diagram in which a zooming lens, having the same maximum focal distance as that in FIG. 1, moves in four steps. In FIG. 4, since the zooming lens is structured in the same way as that in FIG. 3, the slope, on which the rear lens component moves, is decreased more than that in FIG. 1, and the cam cylinder can move more smoothly.

A zooming view finder is driven, being interlocked with the zooming lens barrel, as described above. A magnification ratio of the zooming view finder is changed, being interlocked with that of the zooming lens. Further, it is ideal that the frame of a visual field moves being interlocked with the photographic distance, and a parallax is compensated for. However, because automatic focusing cameras are now commonly used, the photographic lens is not driven even when distance measuring is conducted by pressing a release button in one step while a photographer is viewing through the view finder at the time of photography, and the view finder is not interlocked with the photographic distance. Actually, when the release button is pressed in step 2, the photographic lens is moved. At this time, the shutter is immediately opened and closed. Accordingly, there is no meaning even when the view finder is interlocked with the movement of the photographic lens at this time. Therefore, it is required to select the focal distance position, and to move the view finder to a predetermined position and to stop it there.

On the other hand, the most frequently used photographic distance is in the range between infinity and 1.5 m, and in the case of the visual field of the view finder for the distance smaller than 1.5 m, a short distance correction mark, which is separately provided on the view finder, is used. Accordingly, when the visual field of the view finder is set at approximately 3 m, which is an intermediate distance, there is practically no problem in the fixed frame of the visual field in the range from infinity to 1.5 m. Therefore, the frame of the visual field of the view finder in the above invention is set to 3 m at each focal distance.

FIG. 5 is a partially enlarged view showing the movement of the rear lens component in the zooming diagram in FIG. 3. The horizontal axis shows the focal distance, and the vertical axis shows the amount of movement of the rear lens component. In the upper left portion of the drawing, the magnification M of the zooming view finder, which is interlocked with the zooming lens, is shown. In the drawing, when the focal distance position is set to 40 mm, the rear lens component is located at the position $L_1$, and moves between $L_1$ at 1.5 m and $L_2$ at $\infty$ when focusing. Before the release button is pressed, the view finder is set at the position $f_1$ of 3 m, which is an intermediate position between 1.5 m and $\infty$. In the same way, when the focal distance position is set to 45 mm, the rear lens component is located at the position of $L_2$, and moves between $L_2$ at $\infty$ and $L_3$ at 1.5 m when focusing. The view finder is set for 3 m at the position $f_2$, which is an intermediate value between $\infty$ and 1.5 m. In the same way, hereinafter, the view finder is set to the position $f_3$, at the focal distance of 50 mm, and to the position $f_4$ at the focal distance of 55 mm. Here, $f_1$ is intermediate between $L_1$ and $L_2$, $f_2$ is intermediate between $L_2$ and $L_3$, and $f_3$ and $f_4$ are also set in the same way as described above. Accordingly, because the distance between $f_1$ and $f_2$, and that between $f_2$ and $f_3$, and between $f_3$ and $f_4$ are equal or almost equal, the magnification of an image, formed by the view finder, is changed at a constant ratio when the focal distance position is changed. When the photographer conducts zooming while viewing through the view finder, there is no strange feeling for photographing.

FIG. 6 is an enlarged view of the zooming diagram expressed in the same way as in FIG. 5. In FIG. 6, the nearest distance is set at 0.8 m so that close-up photography can be conducted. However, as described above, it is necessary to set the view finder at almost 1.6 m which is an intermediate value between $\infty$ and 0.8 m so that the magnification of the view finder is changed at a constant ratio. Further, because the focal distance changes during focusing, the difference between the visual field, confirmed by the view finder set at 1.6 m, and the actual picture area becomes larger when photographed at $\infty$ or 0.8 m. That is, when photographed at the infinity side of the zooming lens, the actual picture area is larger than the area confirmed by the view finder, so that the image becomes smaller. Reversely, when photographed at the nearest distance side, the actual picture area is smaller than the apparent area indicated by the view finder, so that the image becomes larger. That is, an influence due to change of the visual field tends to occur, which is a problem.

FIG. 7 is a zooming diagram expressed in the same way as those described above. In FIG. 7, the nearest distance is set at 0.8 m, and the visual field of the view finder, which is an area confirmed by the view finder, is set at 3 m. In this case, the difference between the visual field of the view finder set at 3 m and an actual picture area at the photographic distance of ∞ is not problem. However, as described above, at the distance of 0.8, since there is a problem in which the difference between the visual field confirmed by the view finder and the actual picture area becomes larger, it is necessary to provide a close-up compensation mark in the view finder. However, as can easily be seen from the drawing, although the interval between $f_1$ and $f_2$ is equal to the interval between $f_3$ and $f_4$, the interval between $f_1$ and $f_2$ is not equal to that between $f_2$ and $f_3$. Accordingly, when the focal distance is changed, the magnification of the view finder becomes not a simple constant gain, but a waving gain. Therefore, when the photographer conducts zooming while viewing through the view finder, a strange feeling for photographing occurs, which is another problem.

Further, in current lens shutter cameras, it is required, as described above, to increase the magnification ratio of the photographing lens, and further to enhance the speed of the photographing motions so as not to lose the photo opportunity. Therefore, it is intended to enhance the speed of photography such that each operation provided in the camera, for example, a zooming operation, a focusing operation, etc., is conducted in the shortest period of time possible. Specifically, it is required to conduct the focusing operation, which greatly contributes to reduction of the photographic time itself, at a higher speed, which is a further problem.

SUMMARY OF THE INVENTION

An object of the present invention is to solve the above-described problems.

The above-described object can be accomplished by the following zooming lens barrel. The zooming lens barrel comprises: a plurality of first lens components; a guide portion along which at least one lens component in the plurality of first lens components moves in the direction of the optical axis of the plurality of first lens components, the guide portion having a plurality of focal distance positions; a lens component moving means for moving at least one lens component in the plurality of first lens components along the guide portion in the direction of the optical axis; and a movement control means for controlling the lens component moving means and for moving at least one lens component to a predetermined position, the zooming lens barrel conducting focusing by moving at least one lens component along the guide portion after at least one lens component has been moved to an arbitrary focal distance position in the plurality of focal distance positions by the lens component moving means. The first section guide portion between the first focal distance position, which is an arbitrary focal distance position, and the second focal distance position adjoining the first focal distance position, has at least an area A which is used for focusing at the first focal distance position, and an area B which is not used for focusing, and the second section guide portion between the second focal distance position and the third focal distance position which adjoins the second focal distance position and which is different from the first focal distance position, has at least an area C which is used for focusing at the second focal distance position. The zooming lens barrel described above, is structured as follows.

1) A starting point of area A in the first section guide portion is the nearest focusing position in the first focal distance position; an end point of area A is the furthest focusing position in the first focal distance position and also a starting point of area B; an end point of area B is a starting point of area C and also the furthest focusing position at the second focal distance position.

2) Alternatively, the starting point of area A in the first section guide portion is the furthest focusing position at the first focal distance position; the end point of area A is the nearest focusing position at the first focal distance position and also the starting point of area B; the end point of area B is the starting point of area C and also the nearest focusing position at the second focal distance position, wherein the movement control means controls such that focusing is conducted in area A on the guide portion in the case where the first focal distance position is selected, and focusing is conducted in area C in the case where the second focal distance position is selected, when at least one lens component is moved by the lens component moving means.

Alternatively, the above-described object can be accomplished by the following zooming lens barrel. The zooming lens barrel comprises: a plurality of first lens components; a guide portion, along which at least one lens component in the plurality of first lens components moves in the direction of the optical axis of the plurality of first lens components, the guide portion having a plurality of focal distance positions; a lens component moving means for moving at least one lens component (a) in the plurality of first lens components in the optical axis along the guide portion; the plurality of second lens components which are different from the plurality of first lens components, and at least one component (b) of which moves in the direction of the optical axis of the plurality of second lens components being linked with the component (a); and a movement control means for controlling the lens component moving means and for moving the component (a) to a predetermined position, the zooming lens barrel conducting focusing by moving the component (a) on the guide portion, after the component (a) has been moved to an arbitrary focal distance position in the plurality of focal distance positions, and the component (b) has been moved to a predetermined stop position by the lens component moving means. The guide portion has an area which is used for focusing, and an area which is not used for focusing. The movement control means conducts focusing only in the area, which is used for focusing, on the guide portion, when the component (a) is moved by the lens component movement means. Further, the predetermined stop position is set as follows. There is a difference (i) of the magnification ratio between the magnification ratio of an image formed by the component (b) at the first stop position to which the component (b) is moved when the component (a) is moved to the first focal distance position, which is an arbitrary focal distance position, in the plurality of focal distance positions, and the magnification ratio of an image formed by the component (b) at the second stop position, to which the component (b) is moved, when the component (a) is moved to the second focal distance position adjoining the first focal distance position, in the plurality of focal distance positions. The difference (i) is almost equal to the difference (ii) of the magnification ratio between the magnification ratio of an image formed by the component (b) at the second stop position, and that of an image formed by the component (b) at the third stop position, to which the component (b) is moved when the component (a) is moved to the third focal distance position, which is different from the first focal distance position, and which adjoins the second focal distance position, in the plurality of focal distance positions. The difference (ii) of the magnification ratio can be the difference of the view finder angles, or the difference of the focal lengths of the image formation lens in the view finder.

DETAILED DESCRIPTION OF THE INVENTION

Initially, referring to FIG. 8 through FIG. 21, an embodiment of a zooming lens barrel of the present invention will be described in detail below.

Figure 8:
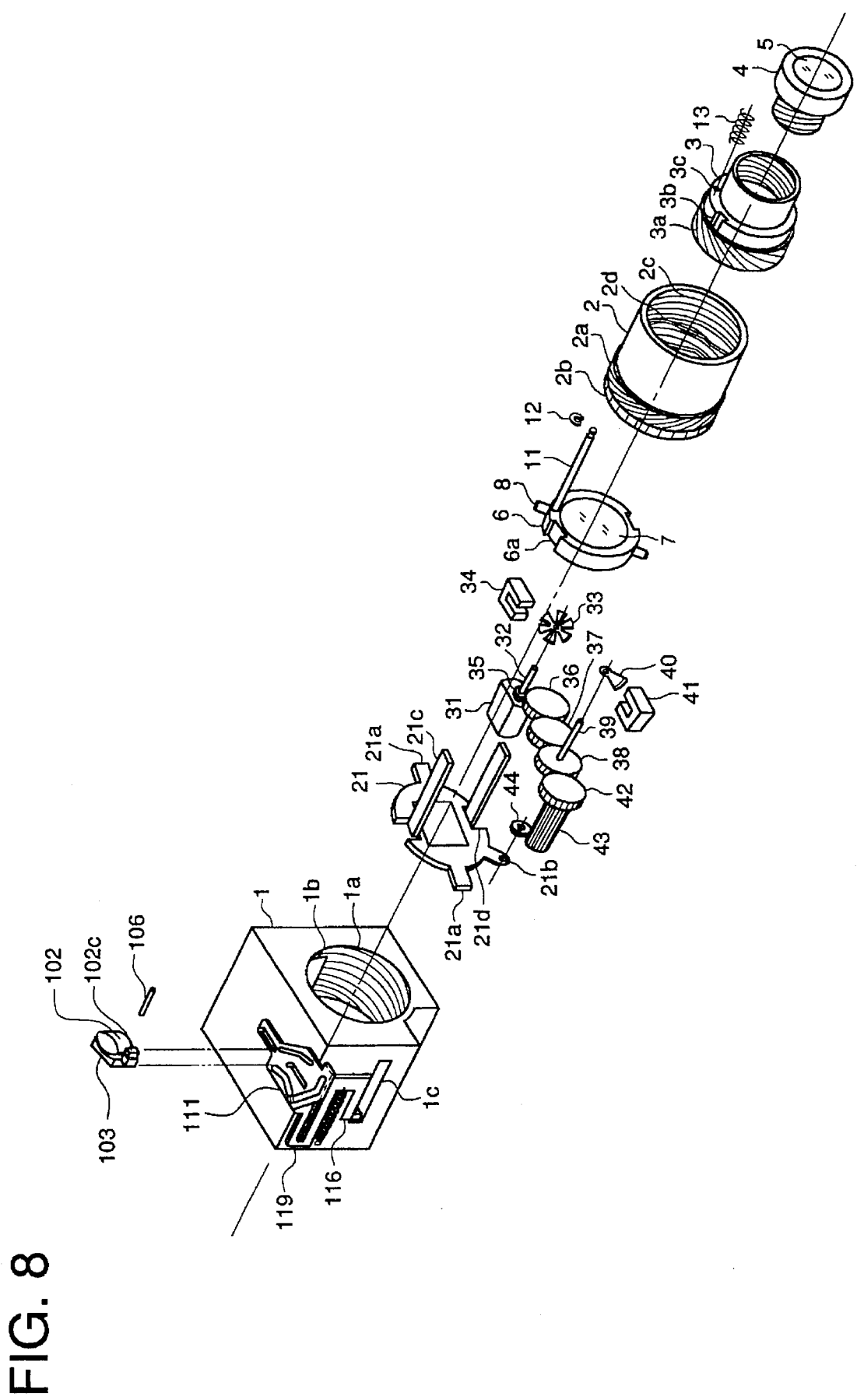
FIG. 8 is an exploded perspective view of a zooming lens barrel of the present invention.
Figure 9:
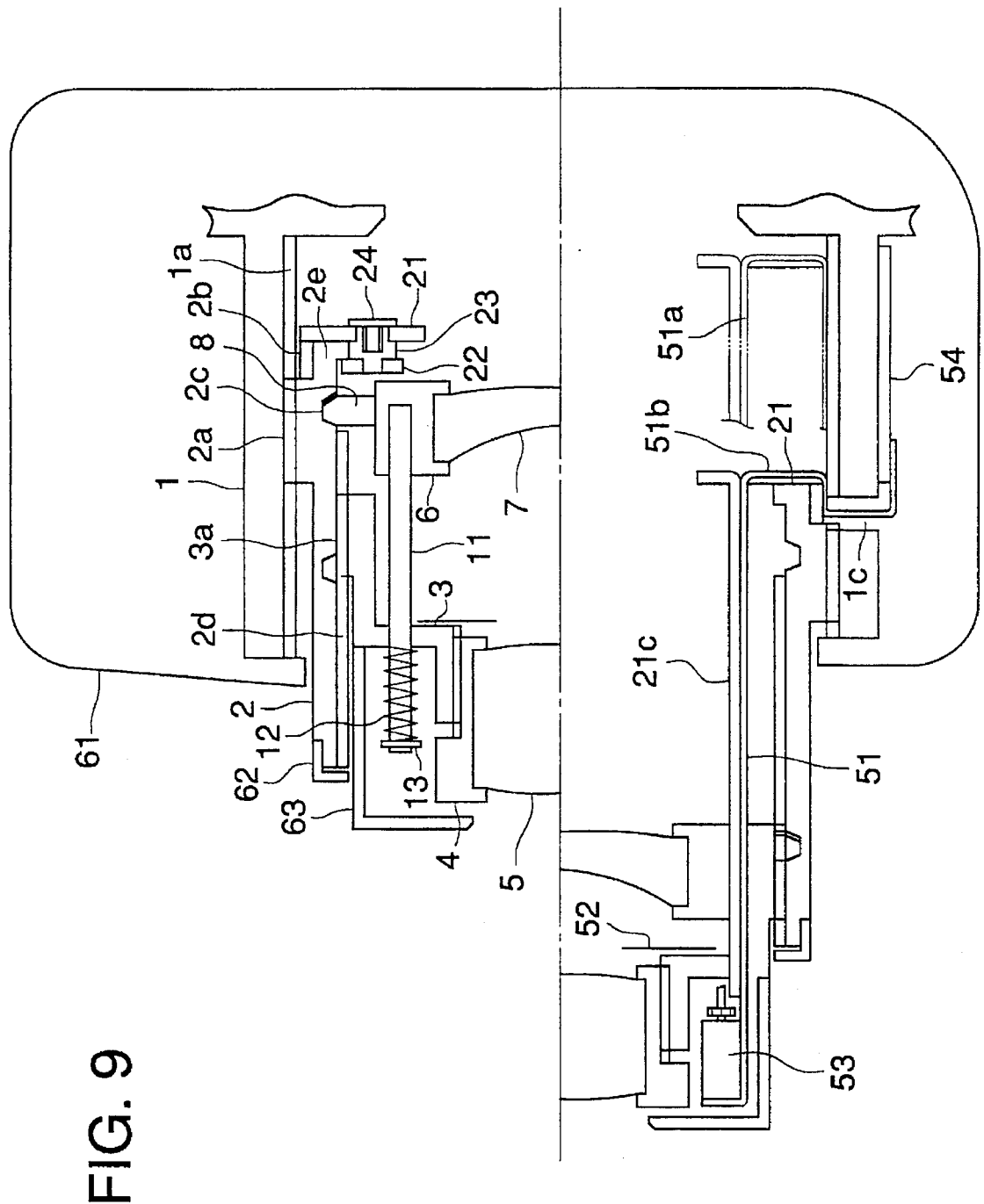
FIG. 9 is a transverse cross-sectional view of the zooming lens barrel of the present invention.
Figure 10:
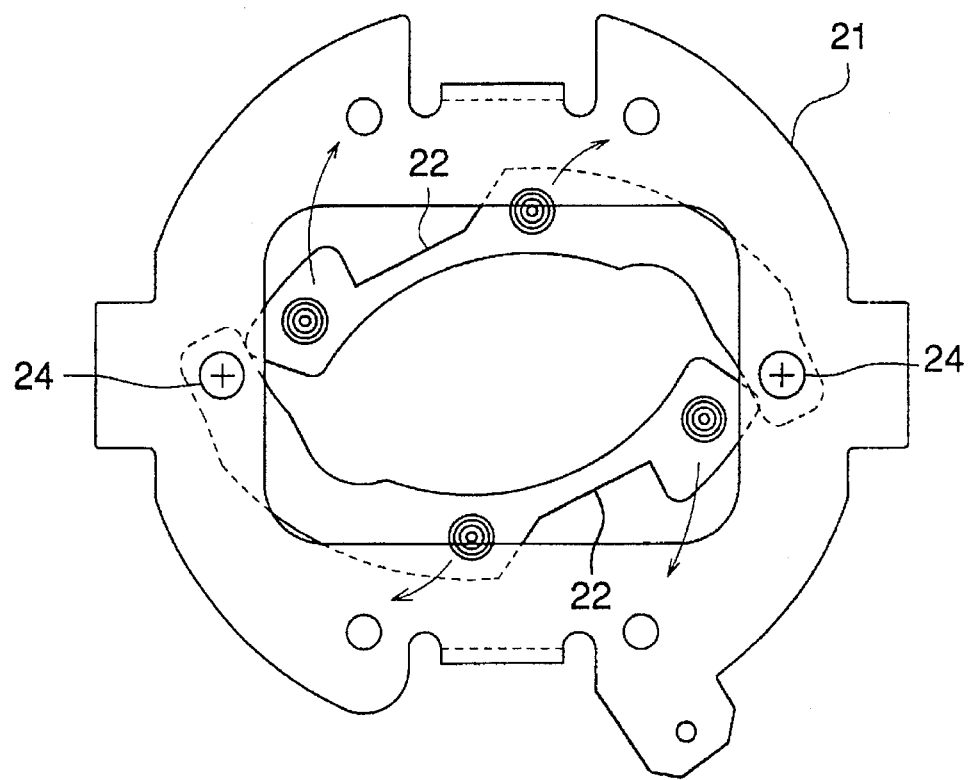
FIG. 10(A) and FIG. 10(B) are schematic illustrations of the assembly of a fixed plate of the zooming lens barrel of the present invention.
Figure 10:
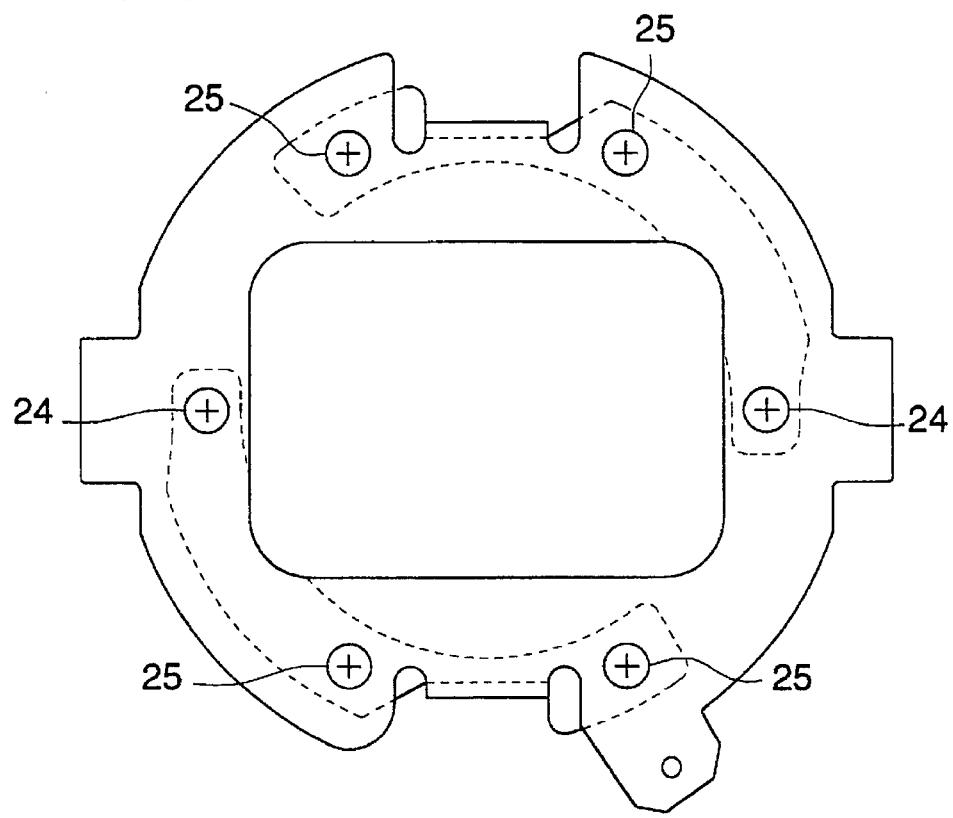
Figure 11:
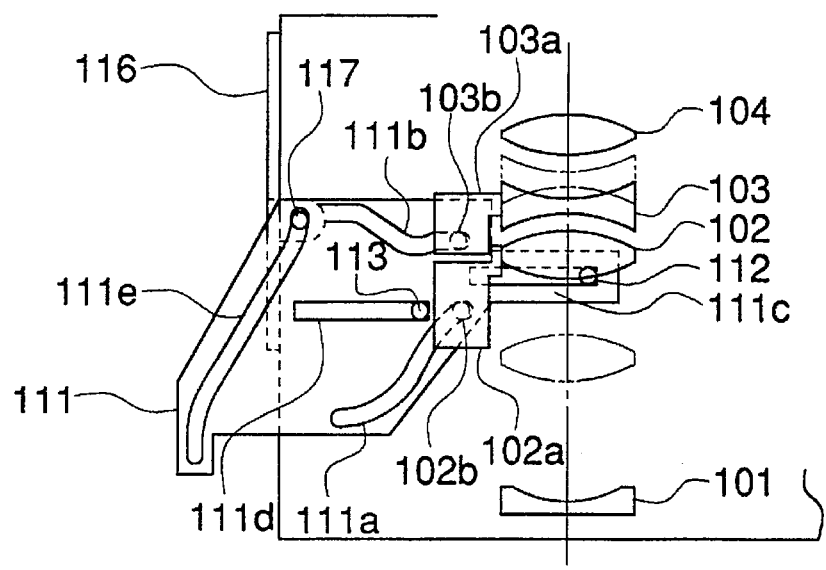
FIG. 11 is a plan view of an interlocking mechanism of a view finder of the zooming lens barrel of the present invention.
Figure 12:
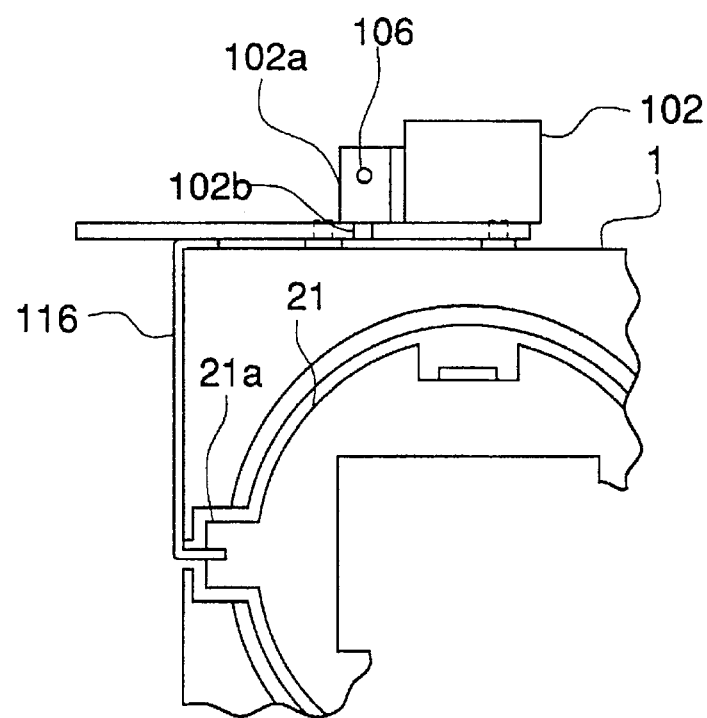
FIG. 12 is a front view of the interlocking mechanism of the view finder of the zooming lens barrel of the present invention.
Figure 13:
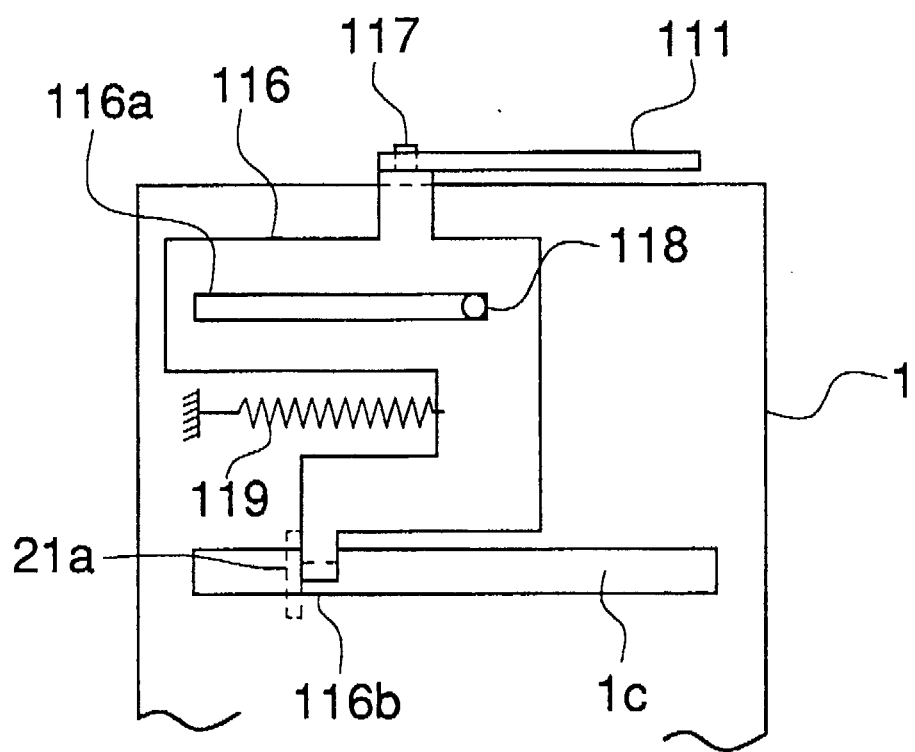
FIG. 13 is a side view of the interlocking mechanism of the view finder of the zooming lens barrel of the present invention.

FIG. 8 is an exploded perspective view of a zooming lens barrel of the present invention, and FIG. 9 is its transverse cross sectional view, in which the focal distance of the upper half of the lens barrel is set to a wide angle range, and in which the focal distance of the lower half of the lens barrel is set to its telephoto range. FIG. 10 is a schematic illustration of assembly of the fixed plate. FIG. 11 is a plan view of an interlocking mechanism of a view finder, and FIG. 12 is a front view of the interlocking mechanism. FIG. 13 is a side view of the interlocking mechanism of the view finder.

Numeral 1 is a fixed barrel which is integrally fixed to the camera main body, and a female belieold 1a is provided on the inner periphery of the barrel. Guide slots 1b for a straight advancing guide 21, which will be described later, is provided on left and right side portions of the female helicoid 1a in such a manner that the guide slots 1b cross the female helicoid 1a. Numeral 2 is a cam cylinder, on the outer periphery of which a male helicoid 2a, which is screwed into the female helicoid 1a, is integrally formed with a large gear 2b. A female helicoid 2c and a cam groove 2d, which is an inner cam, are formed on the inner periphery of the cam cylinder 2, and a rib 2e is provided toward the inside of the rear end portion. Further, the diameter of an addendum circle of the large gear 2b is formed to be smaller than the minor diameter of the male helicoid 2a, which contributes to downsizing of the lens barrel. In this connection, in the case where the cam cylinder 2 is integrally molded with the large gear 2b from resin, when the large gear 2b is located on the rear end surface of the cam cylinder 2, it is not necessary to use a split type mold for molding, but, an integrated type mold can be used for molding, because the molded products are withdraw in one direction only. Accordingly, highly accurate parts can be produced by the simple mold structure.

Numeral 3 is a front lens component sliding frame, onto which a front lens component lens frame 4 for holding the front lens component lens 5 having a positive composite focal distance, is screwed by screws. Dimensional errors of produced parts of the lens system are compensated for by changing the attached portion of the parts by screws. A male helicoid 3a, which is screwed into the female helicoid 2c, and a guide slot 3b for a straight advancing guide 21, which will be described later, and further, a hole 3c for a guide shaft 11, which will be described later, are provided on the outer periphery of the front lens component sliding frame 3. Numeral 6 is a rear lens component sliding frame, and a rear lens component lens 7 having a negative composite focal distance is held by its inner periphery. A guide slot 6a for a straight advancing guide 21, which will be described later, is provided on the outer periphery of the rear lens component sliding frame 6, and a rear lens component cam pin 8, which is engaged with the cam groove 2d, is implanted in the outer periphery of the sliding frame 6. A guide shaft 11 is projected forward from the outer periphery of the sliding frame 6. Numeral 13 is a shaft spring into which the guide shaft 11 is inserted, and numeral 12 is an E-type stop ring to secure the shaft spring 13.

Numeral 21 is the straight advancing guide, and slides in the guide slot 1b of the fixed barrel 1 by the left and right protruded portions 21a. A drive gear 44, which will be described later, is pivotally supported rotatably by another protruded portion 21b, and the straight advancing guide 21 slides in the guide slot 3b and the guide slot 6a by an arm portion 21c, which folds toward the front of the lens barrel. Numeral 22 is a guide fixed plate for connecting the cam cylinder 2 to the straight advancing guide 21, and numeral 23 is a fixed guide shaft for connecting the straight advancing guide 21 to the fixed guide plate 22 and for holding the cam cylinder 2 by the rib 2e. Numeral 24 is a screw for securing the straight advancing guide 21 on the guide fixed shaft 23.

Numeral 31 is a lens barrel driving motor, with a propeller 33, attached on the shaft 32. Continuous pulses showing the operational positions of the front lens component lens 5 and the rear lens component lens 7 are generated by a photo-interruptor 34. Numeral 35 is a pinion, which is directly connected to the motor. The rotation of the motor 31 is transmitted to the fifth gear 43, on which a long gear is formed in the direction of the optical axis, through the first gear 36, the second gear 37, the third gear 38 and the fourth gear 42. The drive gear 44 is engaged with the large gear 2b of the cam cylinder 2. A propeller 40 is attached to the shaft 39 of the third gear 38, and intermittent pulses showing the zooming position are generated by a photo-interruptor 41.

Numeral 52 is a shutter, and numeral 53 is a shutter driving motor, both of which are mounted on the front lens component sliding frame 3. Numeral 51 is an FPC board, to which the shutter driving motor 53 and a print circuit board 54, on which electronic parts of the main body side are mounted, are connected. After the FPC board 51 is connected to the shutter driving motor 53, the board passes through a gap formed between an arm portion 21c of the straight advancing guide 21 and the inner periphery of the cam cylinder 2 toward the rear of the camera, returns from the rear end of the cam cylinder 2, and passes through a gap formed between the outer periphery of the cam cylinder 2 and the fixed barrel 1 toward the front of the camera. There is provided a hole 1c at a position located on the front side of the camera with respect to the rear end of the cam cylinder 2, when the cam cylinder 2 is thrust out to its maximum with respect to the fixed barrel 1. The FPC board 51 passes through the hole 1c, and is withdrawn onto the outer periphery of the fixed barrel, and then, it is connected to the print circuit board 54 of the main body side. In this connection, numeral 51a represents the FPC board 51, located at the position in which the lens barrel is collapsed at the maximum. Numeral 61 is the outer shape of the camera. A decoration ring 62 is attached to the cam cylinder 2, and a front barrel 63 is attached to the front lens component sliding frame 3.

Numeral 101 is the first lens of the zooming view finder, and numerals 102, 103 and 104 are respectively the 2nd, 3rd, and 4th lenses thereof. In the present invention, the view finder is structured as a real image type, in which: a real image is formed behind the fourth lens by this 4-elements composition lens; and this real image is observed by a common objective lens, not shown in the drawing, and further, the view finder is structured as a zooming view finder in which variable magnification is conducted when the second lens and the third lens are moved.

In FIG. 11, a wide angle position of the second lens 102 and the third lens 103 is shown by a solid line, and a telephoto position thereof is shown by a two-dotted chain line. Pins 102b and 103b are respectively protruded downward from side portions 102a and 103a of the second lens 102 and the third lens 103, and are respectively engaged with cam holes 111a and 111b provided in the camplate 111. Holes, parallel to the optical axis, are provided in the side portions 102a and 103a of the second lens 102 and the third lens 103, and are engaged with a guide pin 106, fixed on a finder base, not shown in the drawing. The parallel holes hold the optical axes of the second lens 102 and the third lens 103, and serve as a guide for the movement in the direction of the optical axis. Guide holes 111c and 111d in the camplate 111 are respectively engaged with guide pins 112 and 113, vertically provided on the fixed barrel 1, and the camplate 111 can move transversely. A cam hole 111e provided in the camplate 111 is engaged with a pin 117 vertically provided on an interlocking plate 116 attached to the side surface of the fixed plate 1. A guide hole 116a provided in the interlocking plate 116 is engaged with a guide pin 118, vertically provided on the fixed barrel 1, and the interlocking plate 116 can slidably move toward the optical axis of the photographic lens and the view finder. A bent portion 116b is provided below the interlocking plate 116, and the bent portion is engaged with the surface, which is on the movable barrel 2 side, of the protruded portion 21a of the straight advancing guide 21 through a long hole 1c provided in the side wall of the fixed barrel 1. Further, the interlocking plate 116 is activated by the force of a spring 119 toward the rear of the camera.

Next, basic operations of the zooming lens barrel will be described.

In the zooming lens barrel of the present example, the focusing area is provided in the zooming area, the front lens component lens 5 and the rear lens component lens 7 are driven by one and the same mechanism, and zooming and focusing are conducted. Accordingly, in the case where zooming or focusing is conducted, when a drive motor 31 is driven by a signal, not shown in the drawing, the driving force is transmitted to the fifth gear 43 through gear trains 35, 36, 37, 38 and 42, and the fifth gear 43 transmits the driving force to a drive gear 44 attached to the straight advancing guide 21. The drive gear 44 is engaged with a large gear 2b, and the cam cylinder 2 is rotated. Then, the cam cylinder 2, which is helicoidally screwed into the fixed barrel 1, is moved toward the optical axis. At this time, the cam cylinder 2 is moved toward the optical axis forward or backward depending on the rotational direction of the drive motor 31. The straight advancing guide 21 is integrally attached to the rib 2e of the cam cylinder 2 by the fixed guide plate 22, the fixed guide shaft 23, and the set screw 24. The straight advancing guide 21 is prevented from rotating by left and right protruded portions 21a and the guide slot 1b provided in the fixed barrel 1, and is only moved in the direction of the optical axis. Similarly, the front lens component sliding frame 3 is prevented from being rotated by the arm portion 21c of the straight advancing guide 21 in the guide slot 3b. Further, since the guide shaft 11, projecting from the rear lens component sliding frame 6, penetrates the front lens component sliding frame 3, the rear lens component sliding frame 6 is prevented from being rotated, together with the front lens component sliding frame 3. Accordingly, when the cam cylinder 2 is rotated and moved, the front lens component sliding frame 3, which is helicoidally connected to the cam cylinder 2, and the rear lens component sliding frame 6, which is connected to the cam cylinder with cam, are only moved forward or backward toward the optical axis.

The cam groove 2d of the cam cylinder 2 is formed in such a manner that an inclination angle, smaller than the lead angle of the female helicoid 2c, and an inclination angle, larger than that, are alternately repeated. While the front lens component sliding frame 3 is moved linearly by the helicoid, the rear lens component sliding frame 6 is alternatingly moved in the form of a "tooth-shape". As described in the zooming diagram, which will be described later, since a focusing area is provided in a zooming area, the focusing drive and the zooming drive can be conducted by one and the same mechanism.

When the cam barrel 2 is moved, the engagement position of the fifth gear 43, with the drive gear 44, changes in the direction of the optical axis. However, since the fifth gear 43 is a long toothed shaft aligned with the optical axis, engagement is always maintained, in spite of movement of the cam cylinder 2. Further, the rib 2e prevents the straight advancing guide 21 from being thrust out, and further, the inner surface portion of the rib 2e serves as the bearing surface for receiving the rotation of the cam cylinder 2, resulting in prevention of deformation of the cam cylinder 2 during transmission of the driving force.

Referring to FIG. 10(A) and FIG. 10(B), the status, in which the straight advancing guide 21 and the fixed guide plate 22 are assembled, will be described below. In FIG. 10(A), the following operations are conducted for higher assembling efficiency. Two fixed plates 22 are temporarily fixed respectively onto the straight advancing guide 21 by set screws 24. After the straight advancing guide 21 has been assembled into the cam cylinder 2 from the back of the camera, the fixed plates 22 are rotated clockwise around the set screw 24, and fixed onto the straight advancing guide 21 by set screws 24 and 25, by 6 screws in total, as shown in FIG. 10(B). As described above, since the front lens component sliding frame 3 can be guided straight into the fixed barrel 1 by a single straight advancing guide 21, high accuracy of straight advancement of the front lens component sliding frame 3, and the higher efficiency of the driving force for straight advancing operations are assured.

In the photographic lens barrel assembled as described above, when the cam cylinder 2 advances toward the optical axis while being rotated, the straight advancing guide 21 is also advanced toward the optical axis. Accordingly, the interlocking plate 116 is moved in front of the photographic lens against the force of a tension spring 119 by the protruded portion 21a of the straight advancing guide 21 through a bent portion 116b. A pin 117 is also moved in front of the photographic lens when the interlocking plate 116 is moved, and accordingly, the camplate 111 receives stress in the direction of the right in FIG. 11, following the cam hole 111e. Guide holes 111c and 111d slide with respect to guide pins 112 and 113, and move toward the right. Pins 102b and 103b move toward the optical axis by cam holes 111a and 111b of the camplate 111. The second lens 102, and the third lens 103 move from the position shown by a solid line to the position shown by the two-dotted chain line, and the magnification ratio of the view finder changes from the wide angle side to the telephoto side. At this time, pins 102b and 103b are forced by a spring, not shown in the drawing, in the direction in which these pins approach to each other, and therefore, pins 102b and 103b respectively come into contact with a single surface of each of cams 111a and 111b, and are positioned.

When the advanced cam cylinder 2 retreats, the straight advancing guide 21 also retreats toward the optical axis, and the interlocking plate 116 is also moved toward the rear by the force of the tension spring 119. Accordingly, the cam plate 111, which has been moved toward the right in FIG. 11, is moved toward the left, and the second lens 102 and the third lens 103 are moved from a position shown by the two-dotted chain line, to the direction of a solid line. The lens barrel of the photographic lens can be further collapsed from the retracted wide angle position, and accordingly, the cam cylinder 2 and the straight advancing guide 21 are further collapsed. At this time, the interlocking plate 116 is stopped by the right end of the guide hole 116a, and remains in place. Ultimately, the second lens 102 and the third lens 103 also remain in place.

Figure 14:
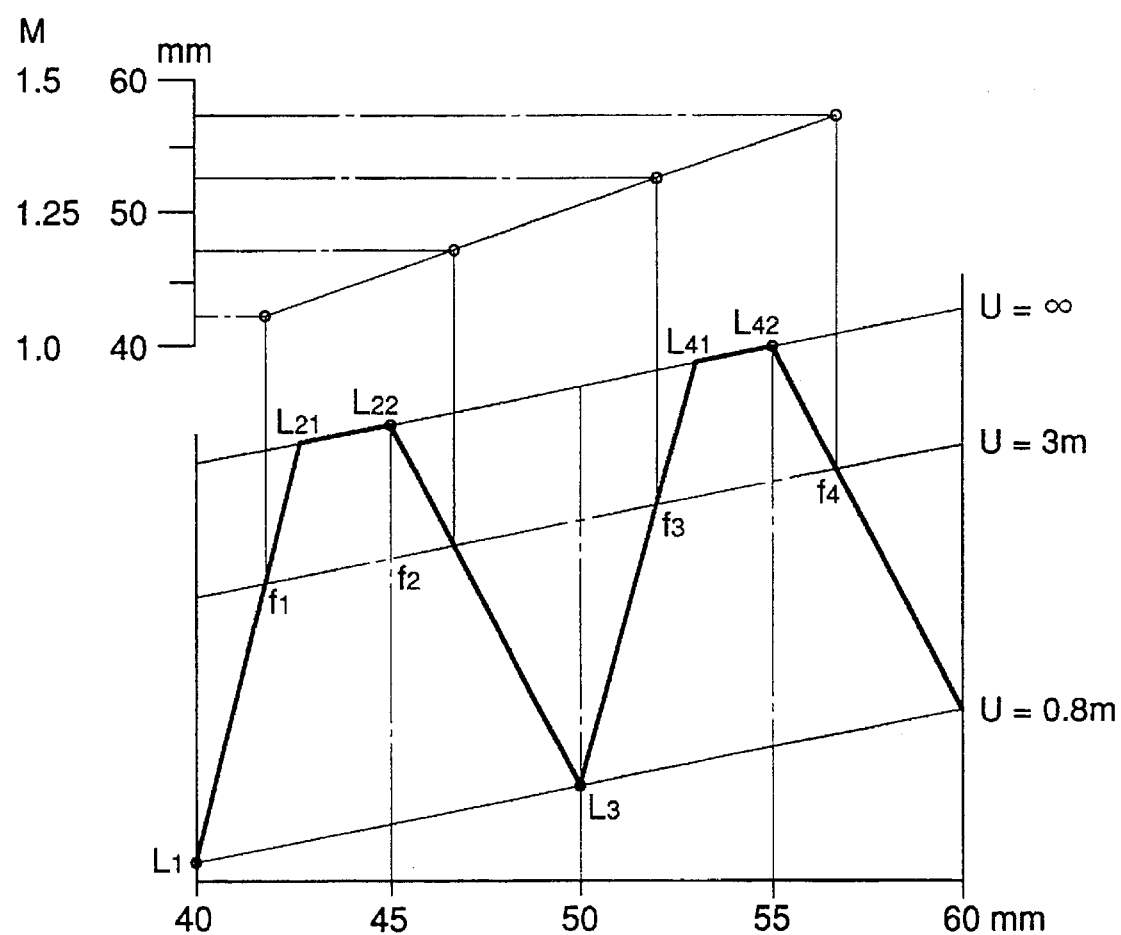
FIG. 14 is a zooming diagram of the zooming lens barrel of the present invention.

In the zooming lens barrel described above, the rear lens component moves according to the zooming diagram shown in FIG. 14.

Figure 1:
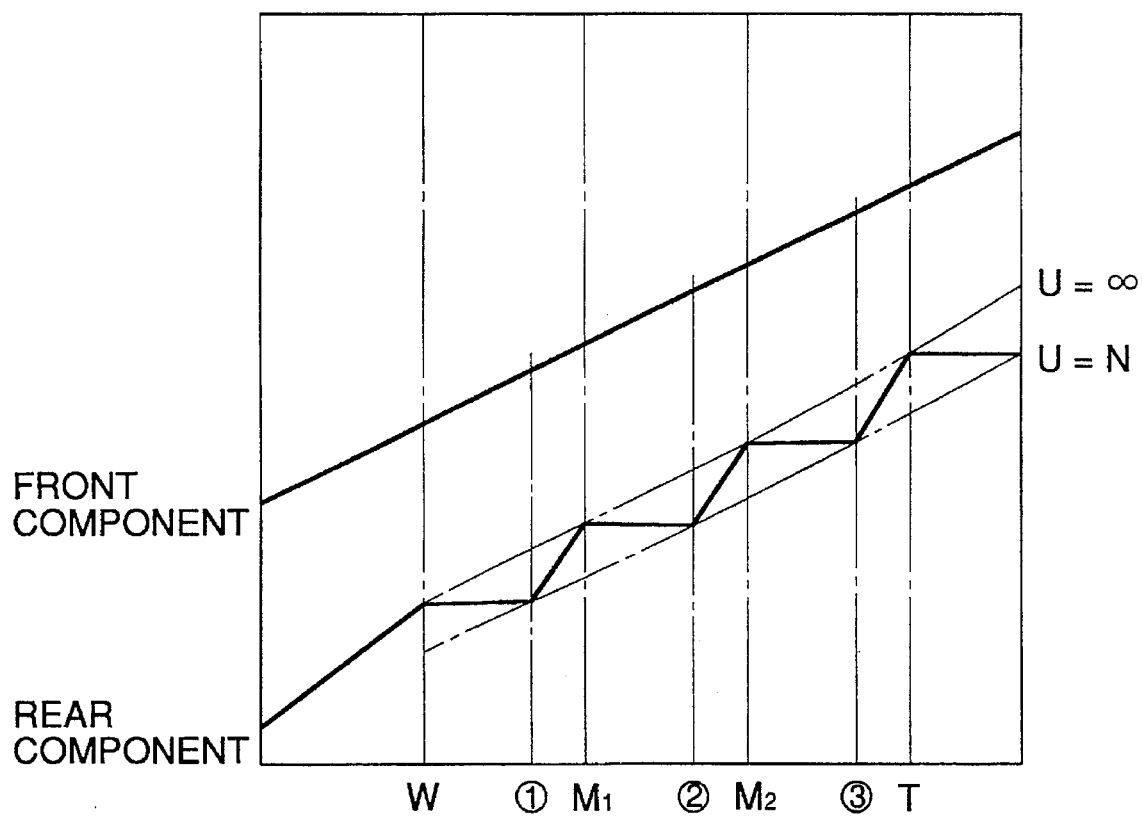
FIG. 1 is a zooming diagram for conventional step zooming.
Figure 2:
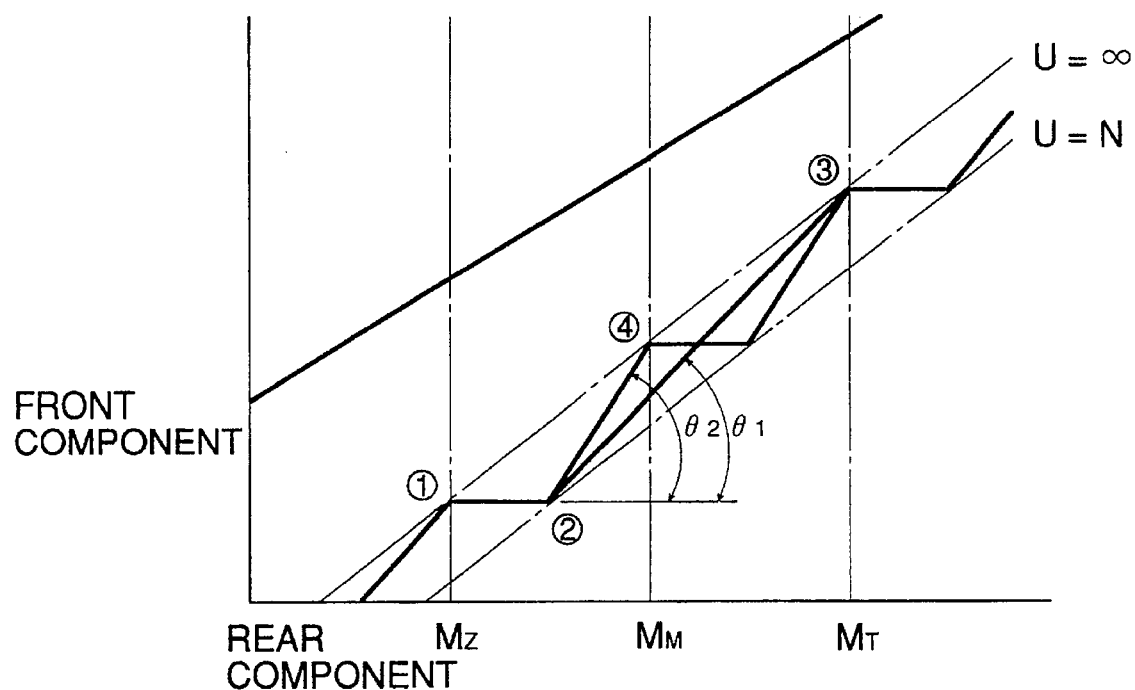
FIG. 2 is an enlarged view of the zooming diagram for the conventional step zooming.
Figure 3:
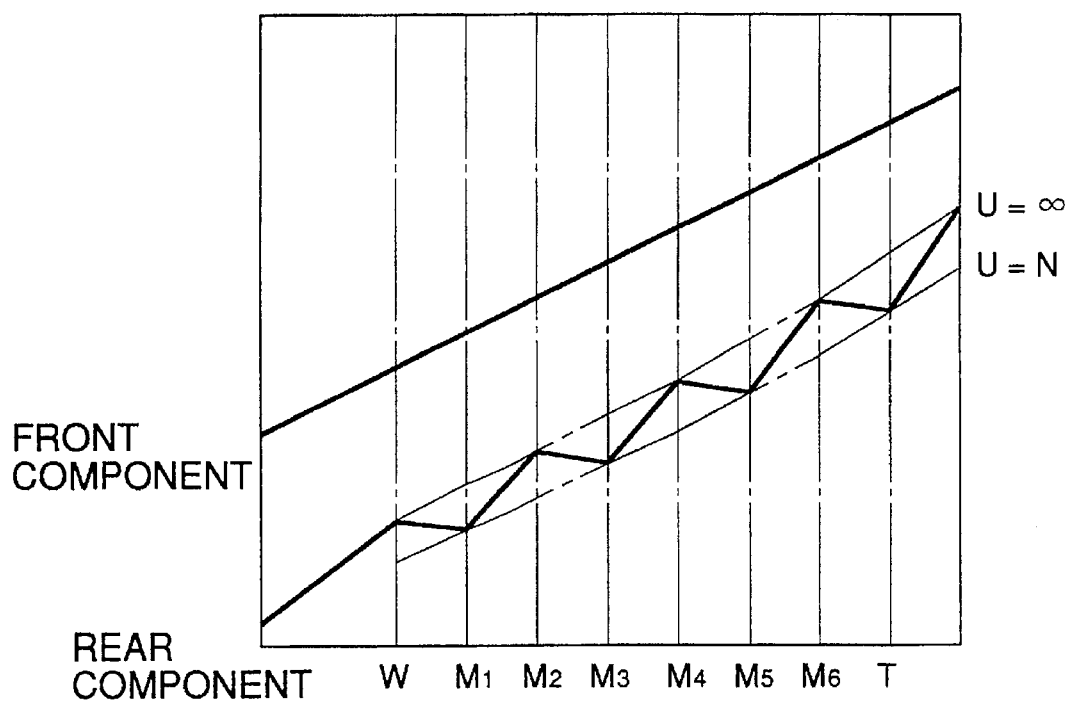
FIG. 3 is a zooming diagram in which a focal distance is divided into 8 steps.
Figure 4:
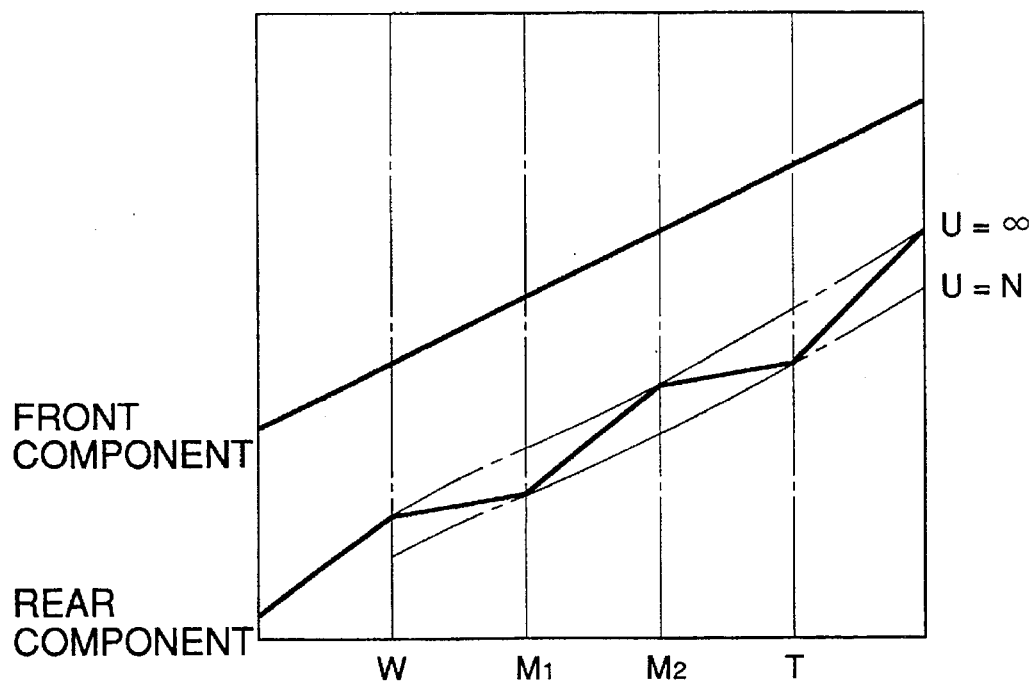
FIG. 4 is a zooming diagram in which a focal distance of a zooming lens having the same focal distance as that in FIG. 1, is divided into 4 steps in the same structure as that in FIG. 3.
Figure 5:
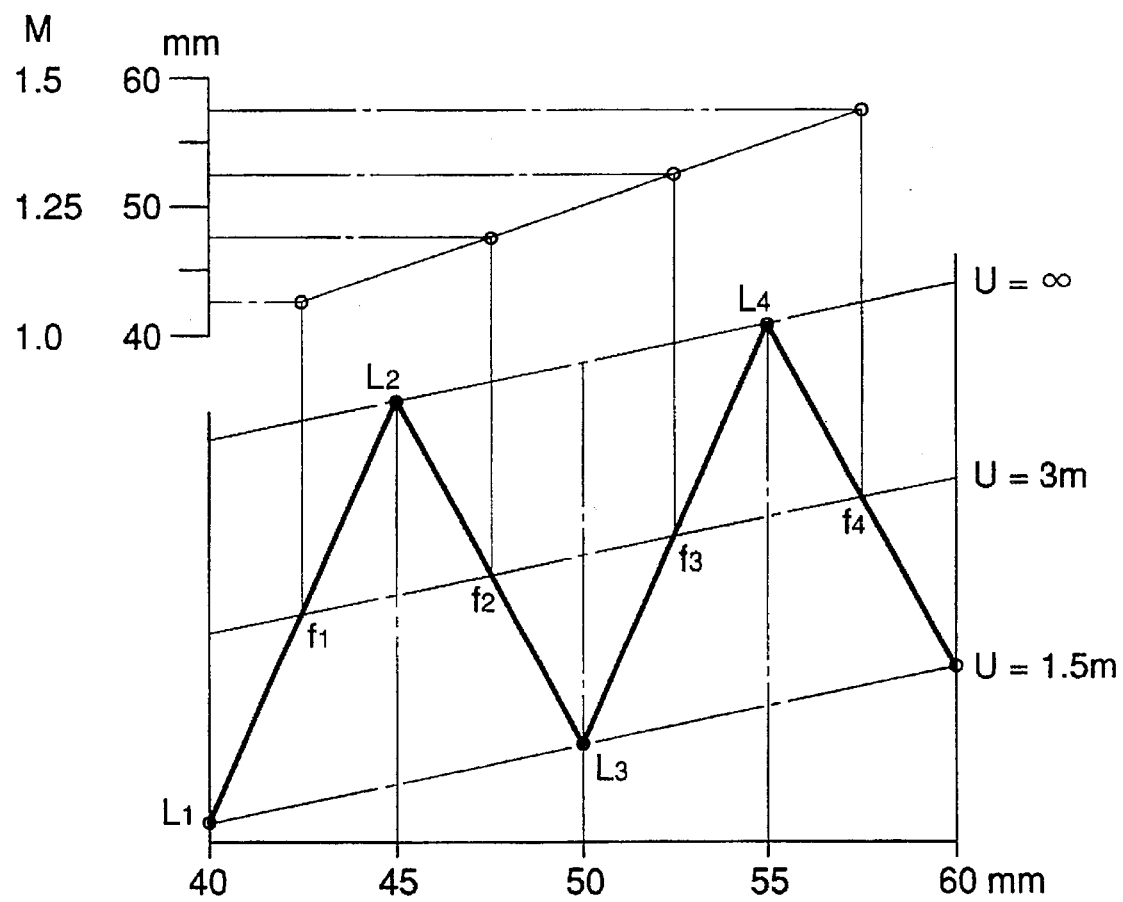
FIG. 5 is an enlarged view of a zooming diagram showing the movement of the rear lens component.
Figure 6:
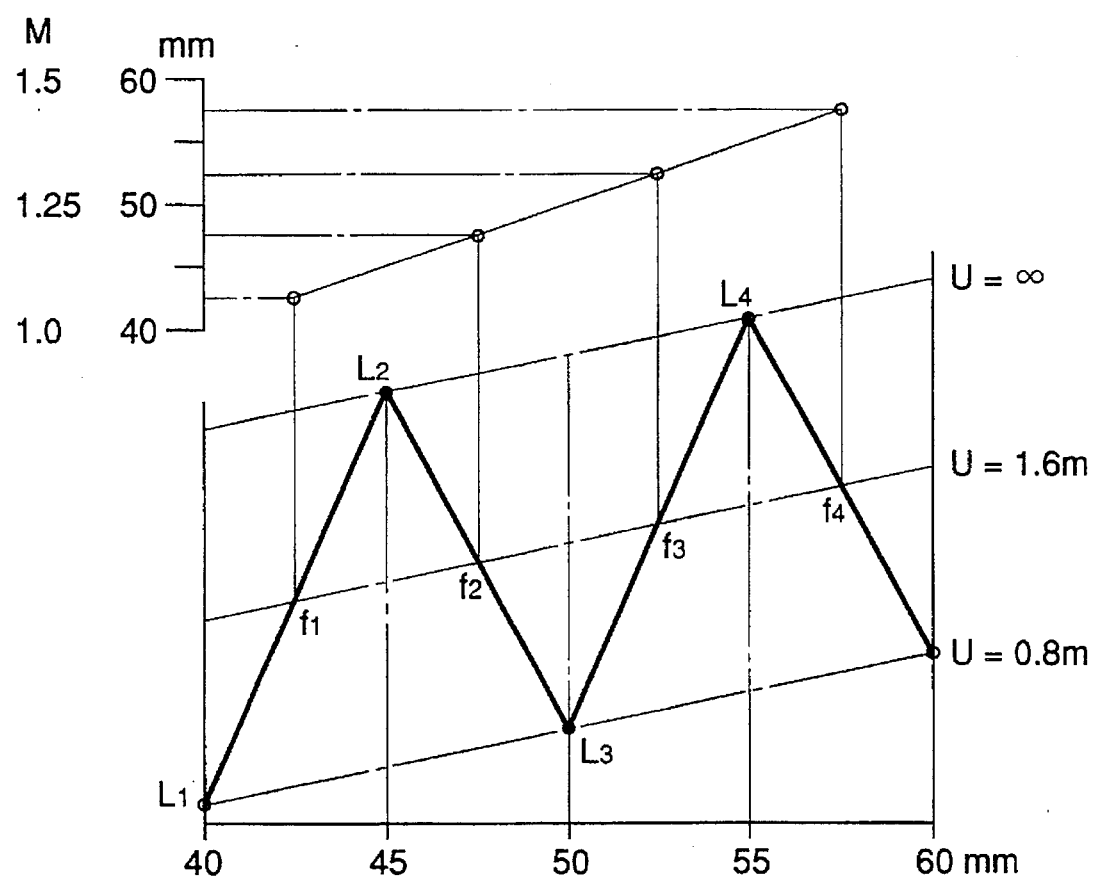
FIG. 6 is an enlarged view of a zooming diagram showing the movement of the rear lens component.
Figure 7:
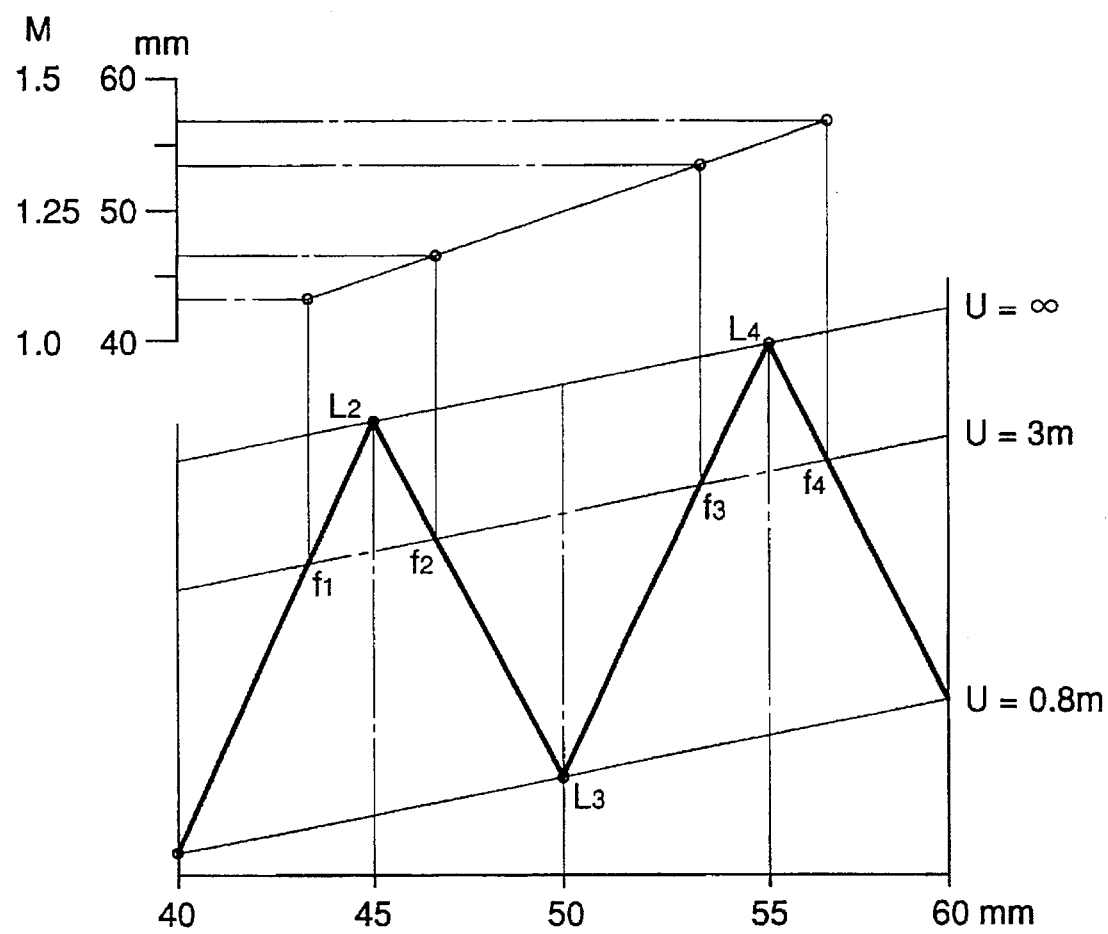
FIG. 7 is an enlarged view of a zooming diagram showing the movement of the rear lens component.

FIG. 14 is a zooming diagram, similar to FIG. 7, in which the nearest distance is set at 0.8 m, and the visual field of the view finder is set at 3 m. Differences from those in FIG. 7 are as follows. The slope of the rising line from 0.8 m to ∞ is larger than in FIG. 7. In order to make the interval between $f_1$ and $f_2$, $f_2$ and $f_3$, and $f_3$ and $f_4$, nearly equal to each other, the focusing position is not changed between $L_{21}$ and $L_{22}$, and between $L_{41}$ and $L_{42}$, with respect to a predetermined change of the focal distance, and is maintained at the ∞ position. As described above, when the rear lens component moves according to the trapezoidal shape zooming diagram, the change of the magnification ratio of the view finder is constant even when the focal distance is changed. Accordingly, even when zooming is conducted while the photographer is viewing through the view finder, there is no strange feeling for photographing.

That is, when $L_1$ is the first focal distance position, $L_{22}$ is the second focal distance position, and $L_3$ is the third focal distance position, the portion between $L_1$ and $L_{22}$ is the first section guide portion, and the portion between $L_{22}$ and $L_3$ is the second section guide portion. The portion between $L_1$ and $L_{21}$ is area A which is used for focusing at the first focal distance position, and the portion between $L_{21}$ and $L_{22}$ is area B which is not used for focusing, and the portion between $L_{22}$ and $L_3$ is area C which is used for focusing at the second focal distance position.

Further, when the first and the third focal distance positions are selected, (when the photographing lens group is moved to $L_1$, $L_{22}$ and $L_3$), predetermined stop positions, at which the view finder lens group remains while the focal distance positions are selected, are $f_1$, $f_2$ and $f_3$, wherein the predetermined stop positions are moved being interlocked with the selection of the focal distance positions of the photographic lens. The difference between the magnification ratio of the image formed at f1, and that of the image formed at $f_2$ is expressed by (i), and the difference between the magnification ratio of the image formed at $f_2$ and that of the image formed at $f_3$, is expressed by (ii).

In more detail, when the focal distance position of the photographic lens is set to a focal distance of 40 mm, in the example in FIG. 14, the photographic lens focuses the object at 0.8 m. At this time, the view finder is moved to the stop position, in which the view finder is set so as to show the range of the visual field corresponding to $f_1$.

When a zooming lever, not shown in the drawing, is operated, and zooming is conducted (the focal distance position is changed), the focal distance position of the photographic lens is a focal distance of 45 mm, the view finder is moved to a stop position, at which the view finder is set so as to show the range of the visual field corresponding to $f_2$.

When zooming is further conducted, (the focal distance position is also changed), the focal distance is changed in steps to 50 mm, and to 55 mm. Accordingly, the range of the visual field of the view finder changes to $f_3$, and to $f_4$.

For example, when the focal distance is continuously changed from 40 mm to 55 mm, the visual field of the view finder changes from $f_1$ to $f_4$, in accordance with that focal distance change. The change of the range of the visual field of the view finder between respective steps at this time, represents the change of the magnification of the image formed by the view finder in each range of the visual field. In the zooming lens barrel according to the present invention, since the moving diagram of the lens rear lens component is in a trapezoidal form, even when the visual field of the view finder is set to the visual field at the distance which is most used for photographing, the stop position of the view finder can be set such that the change of the magnification of an image, formed by the view finder, is almost constant. Accordingly, even when zooming is conducted while the photographer is viewing through the view finder, the change of the magnification ratio in the view finder is smooth, the photographer can conduct the zooming operation without a strange feeling for photographing.

Further, when the slope of the rising line from 0.8 m to ∞ is large, the moving distance of the lens group for focusing is relatively short, and the focusing speed can be increased.

Figure 15:
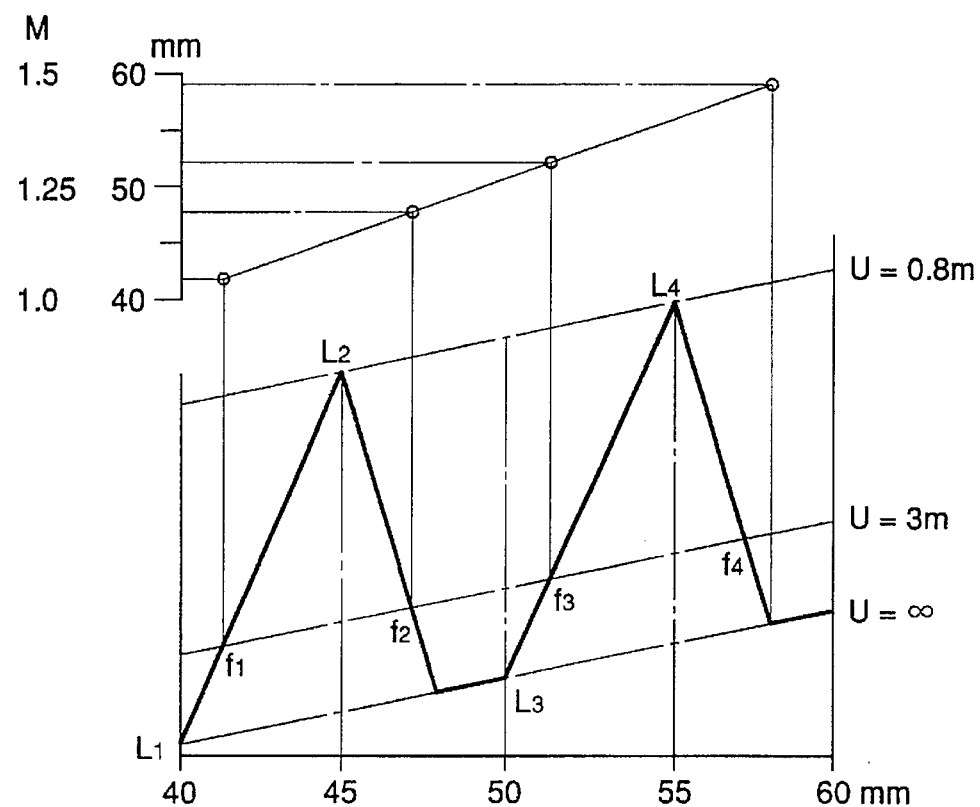
FIG. 15 is a zooming diagram of the zooming lens barrel of the present invention.

Further, when the zooming diagram is set as in FIG. 15, the distance ∞ and the nearest distance 0.8 m can be reversed.

Figure 16:
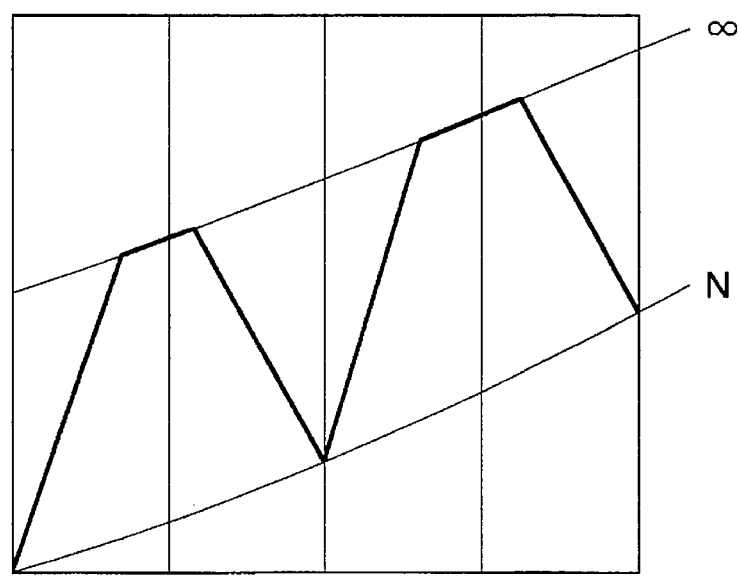
FIG. 16 is a zooming diagram of the zooming lens barrel of the present invention.

In this connection, the example of the present invention is not limited to the embodiment as described above. For example, as shown in FIG. 16, area B in the first section guide portion may "protrude" into the second section guide portion.

Figure 17:
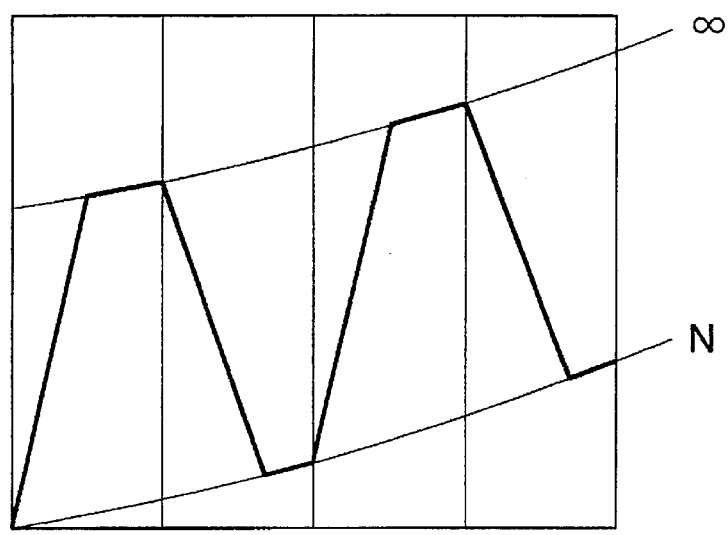
FIG. 17 is a zooming diagram of the zooming lens barrel of the present invention.
Figure 18:
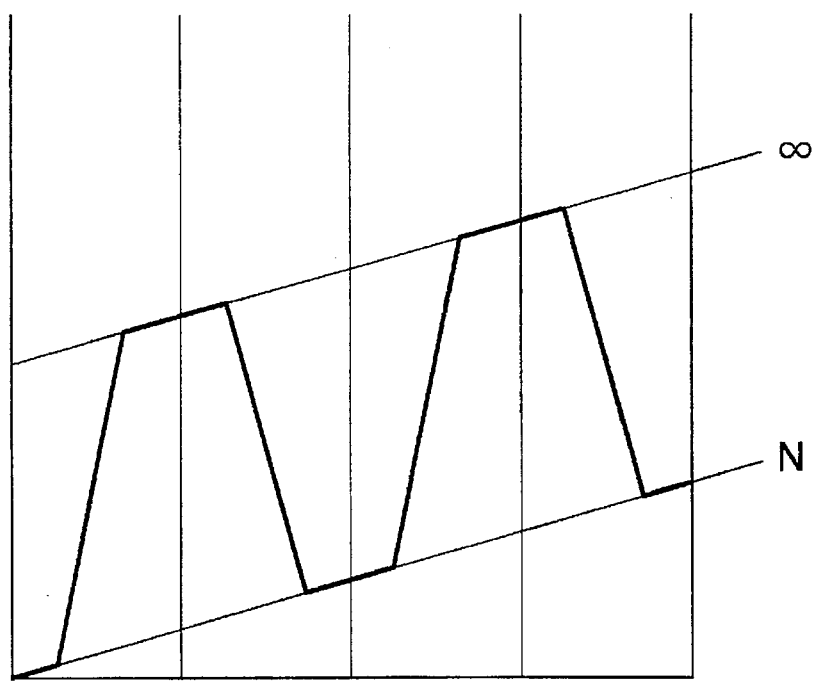
FIG. 18 is a zooming diagram of the zooming lens barrel of the present invention.
Figure 19:
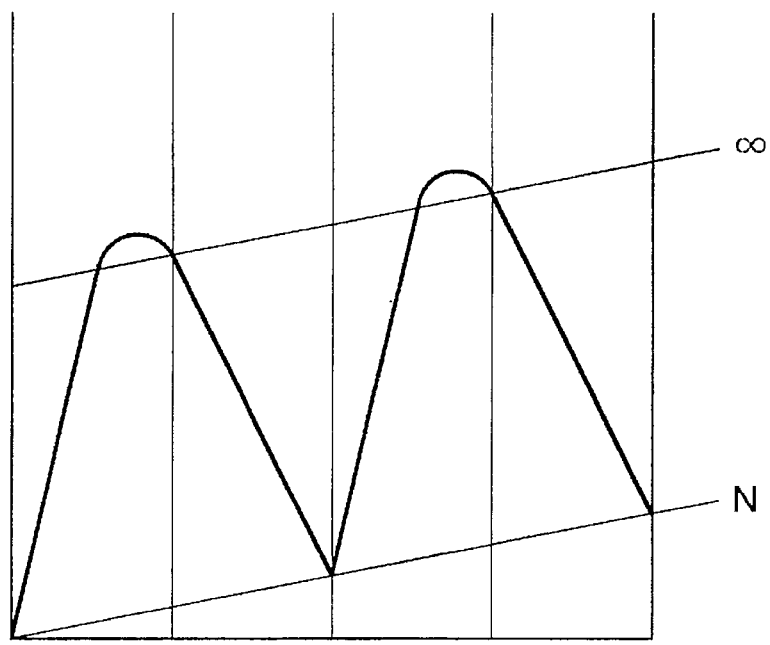
FIG. 19 is a zooming diagram of the zooming lens barrel of the present invention.
Figure 20:
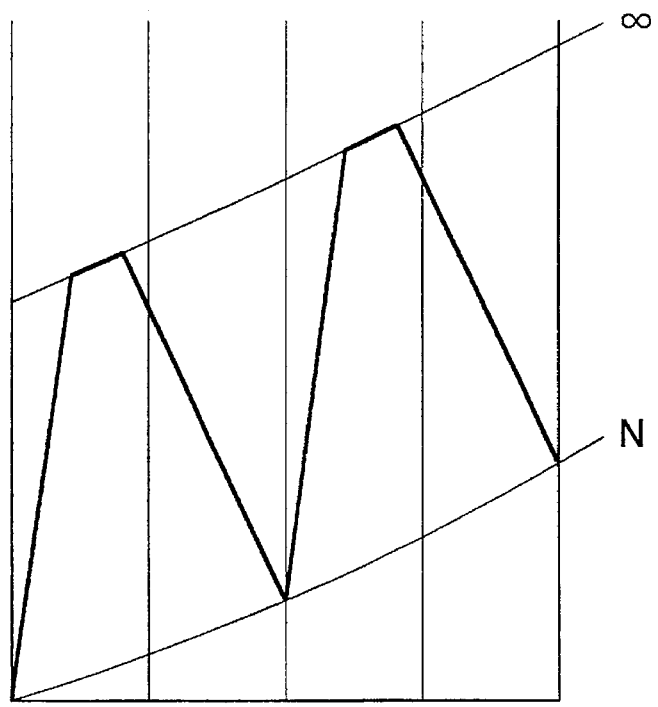
FIG. 20 is a zooming diagram of the zooming lens barrel of the present invention.

Still further, as shown in FIG. 17, an area in which focusing is conducted, and an area in which focusing is not conducted, may be positioned in each section guide portion. Further, as shown in FIG. 18, the zooming diagram may be formed such that: an area in which focusing is conducted, and an area in which no focusing is conducted, are alternately positioned; and focusing is conducted from the position which is different from each focal distance position. Furthermore, as shown in FIG. 19, the focusing position may be changed in area B, and further, as shown in FIG. 20, area C in the second section guide portion is started from the first section guide portion.

Figure 21:
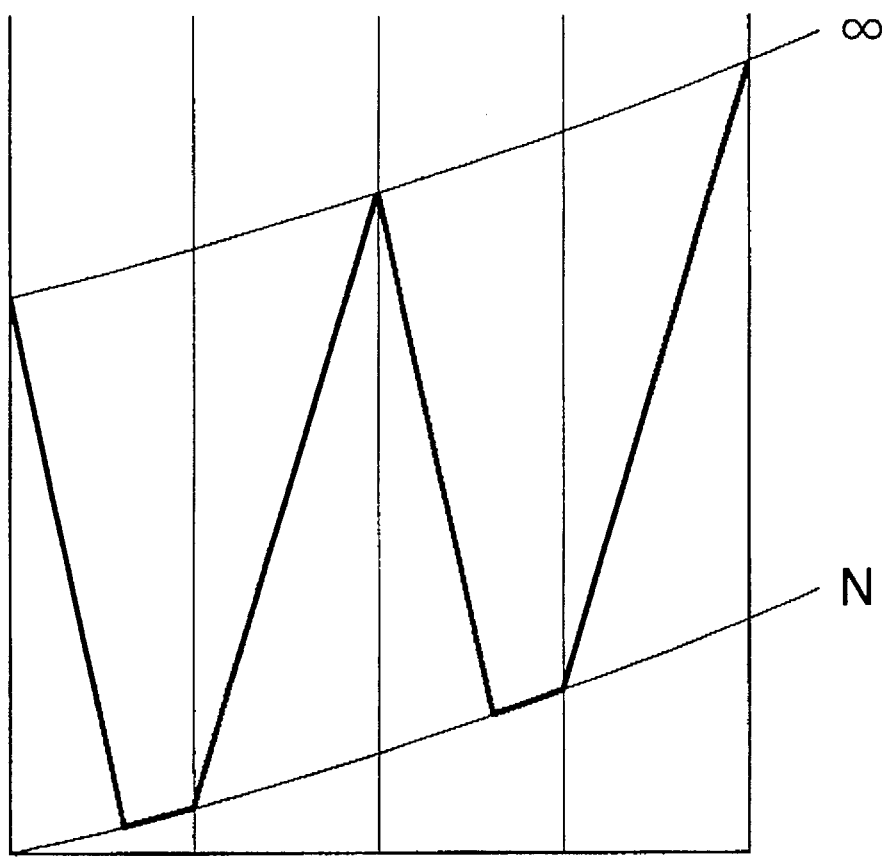
FIG. 21 is a zooming diagram of the zooming lens barrel of the present invention.

Separately from the above, as shown in FIG. 21, the form, in which the starting point of area A is the furthest focusing position, can also be appropriately selected.

In each form described above, when it is determined that the maximum focal distance position is the furthest focusing position, the maximum focal distance of the zooming lens barrel can be extended.

Naturally, the nearest distance is not limited to 0.8 m, but, an arbitrary distance can be set, and further, the setting position of the view finder is not limited to 3 m.

According to the present invention, when the slope of the area, on which focusing is conducted at each focal distance position, is larger, the moving distance of the lens group between the nearest distance side and the near infinity side for focusing, is shorter. Accordingly, the focusing speed can be enhanced, which is one of the excellent advantages of the present invention.

Further, since each focal distance position is set at the starting point of the area, which is used for focusing at the focal distance position, focusing can be conducted from the position in which each focal distance position is selected. That is, zooming (switching of the focal distance position) and focusing can be conducted speedily and continuously, resulting in minor focusing errors, which is another excellent advantage.

Further, when the guide portion is formed as a cam groove, the guide portion can be formed such that molding is easily carried out, the cost is lower, the yield of products is better, and the dimensional accuracy is higher.

Still further, when the plurality of first lens components are moved by zooming operations (switching operations of the focal distance position) so that an arbitrary focal distance position is selected, since the magnification ratio of the image which is formed by the plurality of second lens components, interlocked with the first lens components, changes at an almost constant ratio, even when the photographer conducts zooming operations while referring to the image formed in the view finder by the plurality of second lens components, there is no strange feeling due to the change of the visual field. Further, the visual field of the plurality of second lens components (an area confirmed by the plurality of second lens components) can appropriately be set, resulting in only a minor influence during photography due to the change of the visual field, which is an excellent advantage of the present invention.

Still further, when the plurality of first lens components are moved by zooming operations (switching operations of the focal distance position) so that an arbitrary focal distance position is selected, since the magnification ratio of the image which is formed by the plurality of second lens components, interlocked with the first lens components, changes at an almost constant ratio, even when the photographer conducts zooming operations while referring to the image formed by the plurality of second lens components, there is no strange feeling due to the change of the visual field. Specifically, in a stepped-zoom type zooming lens barrel, when an area in which focusing is conducted, and an area in which no focusing is conducted, are provided so that the movement distance of the lens components between the nearest distance side and the near infinity side for focusing is reduced, since the visual field of the plurality of second lens components (the range confirmed by the plurality of second lens components) can be set appropriately to a preferable range, even when this visual field is set to a distance which is most used for photographing, the magnification ratio of the image formed by the plurality of second lens components changes at an almost constant ratio. Accordingly, even when the zooming operation is conducted while the photographer is referring to the image formed by the plurality of second lens components, there is no strange feeling due to the change of the visual field. Further, the visual field of the plurality of second lens components (the range confirmed by the plurality of second lens components) can also be appropriately set, resulting in a minor influence on photographing due to a change of the visual field, which is one of several excellent advantages of the present invention.

Yet further, when each focal distance position is selected by the zooming operations, the magnification ratio of the image formed by the view finder, which is moved due to being interlocked with the zooming operation, changes at an almost constant ratio. Accordingly, even when the photographer conducts zooming operations while viewing the image through the view finder, there is no strange feeling due to the change of the visual field. Further, the visual field of the view finder (the range confirmed through the view finder) can also be appropriately set, resulting in only a minor influence during photography due to the parallax.

What is claimed is:

1. A camera having a zooming lens barrel comprising (a) first lens components for forming an optical image of an object on a recording medium;

(b) second lens components for visualizing said optical image;

(c) a guide portion, on said zooming lens barrel, adapted to guide said first lens components in a direction parallel to an optical axis of said first lens components so that a field of view of said first lens components is continuously varied at least from a first field of view, through a second field of view narrower than said first field of view, a third field of view narrower than said second field of view, a fourth field of view narrower than said third field of view, to a fifth field of view narrower than said fourth field of view; and (d) a coupler for guiding said second lens components parallel to an optical axis of said second lens components in response to movement of said first lens components so that a field of view of said second lens components is varied stepwise at least from a sixth field of view, between said first field and said third field, through a seventh field of view, between said third field and said fourth field, to an eighth field of view, between said fourth field and said fifth field; and wherein an interval between said sixth field and said seventh field is substantially the same as an interval between said seventh field and said eighth field.

2. The camera of claim 1 wherein said second lens components constitute a view finder of said camera.

3. The camera of claim 1 wherein said coupler interconnects said first lens components with said second lens components.

4. The camera of claim 1 wherein a first range of said field of view of said first lens component between said first field of view and said second field of view is used for focusing said optical image onto said recording medium; a second range of said field of view of said first lens component between said second field of view and said third field of view is not used for focusing said optical image onto said recording medium; and a third range of said field of view of said first lens component between said third field of view and said fourth field of view is used for focusing said optical image onto said recording medium.

5. The camera of claim 1 wherein said guide portion is a cam.

6. A camera having a zooming lens barrel comprising (a) first lens components for forming an optical image of an object on a recording medium;

(b) second lens components for visualizing said optical image;

(c) a guide portion, on said zooming lens barrel, adapted to guide said first lens components in a direction parallel to an optical axis of said first lens components so that a field of view of said first lens components is continuously varied at least from a first field of view, through a second field of view narrower than said first field of view, a third field of view narrower than said second field of view, a fourth field of view narrower than said third field of view, to a fifth field of view narrower than said fourth field of view; and a coupler for guiding said second lens components parallel to an optical axis of said second lens components in response to movement of said first lens components so that a field of view of said second lens components is carried stepwise at least from a sixth field of view, between said first field and said second field, through a seventh field of view, between said second field and said fourth field, to an eighth field of view, between said fourth field and said fifth field; wherein an interval between said sixth field and said seventh field is substantially the same as an interval between said seventh field and said eighth field.

7. The camera of claim 6 wherein said second lens components constitute a view finder of said camera.

8. The camera of claim 6 wherein said coupler interconnects said first lens components with said second lens components.

9. The camera of claim 6 wherein a first range of said field of view of said first lens component between said first field of view and said second field of view is used for focusing said optical image onto said recording medium; a second range of said field of view of said first lens component between said second field of view and said third field of view is used for focusing said optical image onto said recording medium; and a third range of said field of view of said first lens component between said third field of view and said fourth field of view is not used for focusing said optical image onto said recording medium.

10. The camera of claim 6 wherein said guide portion is a cam member.

* * * * *